United States Patent
Buzzolini

[15] 3,674,807
[45] July 4, 1972

[54] 1-P-(ω-AMINOALKYL)PHENYL-CYCLOHEXANES, CYCLOHEXENES AND CYCLOHEXANOLS

[72] Inventor: Mario G. Buzzolini, Morristown, N.J. 07960

[73] Assignee: Sandoz-Wander, Inc., Hanover, N.J.

[22] Filed: Aug. 15, 1969

[21] Appl. No.: 850,675

[52] U.S. Cl..............260/326.5 M, 260/293.82, 260/570.7, 424/267, 424/274, 424/330
[51] Int. Cl. .........................................C07d 27/04
[58] Field of Search................260/326.5 M, 570.7

[56] References Cited

UNITED STATES PATENTS 3,247,199  4/1966  Marxer et al. ..........................260/246

OTHER PUBLICATIONS

Bencze, Chem. Abs. Vol. 60, pp. 15779–15780, (1964).

*Primary Examiner*—Alex Mazel
*Assistant Examiner*—Joseph A. Narcavage
*Attorney*—Gerald D. Sharkin, Frederick H. Weinfeldt, Robert S. Honor, Walter F. Jewell and Richard E. Vila

[57] ABSTRACT

1-p-(ω-aminoalkyl)phenyl-substituted and unsubstituted cyclohexanes, cyclohexenes and cyclohexanols, e.g., 2-[4-(1-cyclohexen-1-yl)cyclohexyloxy]-N,N,-2-trimethylpropylamine hydrochloride. The compounds are useful as hypolipidemic agents.

12 Claims, No Drawings

1-P-(ω-AMINOALKYL)PHENYL-CYCLOHEXANES, CYCLOHEXENES AND CYCLOHEXANOLS

This invention relates to 1-p-(ω-aminoalkyl)phenyl-substituted and unsubstituted cyclohexanes, cyclohexenes and cyclohexanols, intermediates therefor, acid addition salts thereof and process for their preparation.

The compounds of this invention may be represented by the following formula

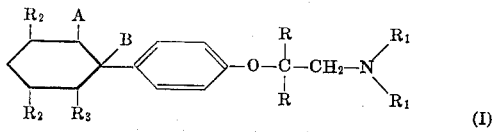

(I)

where each of R and $R_2$ is, independently, hydrogen or lower alkyl of one to four carbon atoms, e.g., methyl, ethyl, propyl or butyl;

each of $R_1$ is, independently, lower alkyl of one to four carbon atoms, e.g., methyl, ethyl, propyl, or butyl, or both $R_1$ together form an alkylene bridge of four to five carbon atoms, e.g., both $R_1$ together with the amino nitrogen form a N-pyrrolidyl substituent, $R_3$ is hydrogen or phenyl; and A is hydrogen;

B is hydrogen or OH; or

A and B together represent a carbon to carbon bond.

The compounds of formula I where A and B are each hydrogen Ia and the other substituents are as defined may be prepared by catalytically hydrogenating the corresponding compounds of formula I where A and B represent a carbon to carbon bond Ib.

The catalytic hydrogenation may be carried out over a fairly wide temperature range typically from 10° C. to 100° C., preferably between 20° C. to 80° C. The hydrogenation may be carried out at atmospheric pressure or at superatmospheric pressure, and usually in the range between atmospheric pressure up to 2,000 p.s.i. The hydrogenation is conducted preferably with an approximately required stoichiometric amount of elemental hydrogen and in the presence of inert organic solvent and hydrogenation catalyst of which several are known and available, such as platinum supported on carbon or palladium on carbon. The especially preferred catalyst is palladium supported on carbon, e.g., a catalyst of a minor portion of 3 – 10 percent palladium on 90 – 97 percent charcoal. Such charcoal supported palladium catalysts are of a well-known type. The especially preferred solvent for use with palladium-carbon catalyst is acetic acid. Compounds Ia are conveniently recovered in the form of an acid addition salt, preferably the hydrochloride, and, if desired, may be converted to the free base by conventional procedures, e.g., dissolution of the salt in water and precipitation using a base such as sodium carbonate or sodium hydroxide.

Compounds Ia may be recovered using conventional techniques such as crystallization.

Compounds Ib in acid addition salt form may be prepared from the compounds of formula I where A is hydrogen, and B is OH Ic by dehydration in a known manner such as by contacting compound Ic with a strong acid, preferably a strong inorganic acid such as hydrochloric acid.

Compounds Ib may be recovered as the free base by treating the acid addition salt form of compound Ib above in water with a base such as sodium hydroxide up to pH 10. The free base of compound Ib may, if desired, be reconverted into an acid addition salt form by treating the free base with a strong acid, preferably a strong mineral acid.

Compounds Ib may be recovered using conventional techniques such as crystallization.

Compounds Ic may be prepared by reacting a substituted cyclohexanone of the formula

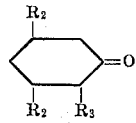

(II)

with a Grignard compound of the formula

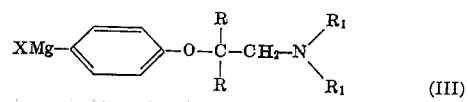

(III)

wherein R, $R_1$, $R_2$ and $R_3$ have the above stated significance and X is halo of atomic weight of from 35 to 127, followed by conventional hydrolysis.

As illustrated, compounds Ic are produced by the reaction of a compound of formula II with an appropriate Grignard compound of formula III. The reaction is carried out in a conventional manner in the presence of an inert organic solvent and preferably at temperatures between about −10° C. to +80° C., followed by hydrolysis in the conventional manner, i.e., in a neutral medium such as water or saturated ammonium chloride solution. Preferred solvents are those customarily employed in Grignard reactions, including, by way of illustration, tetrahydrofuran, dioxane and other ethers such as diethyl ether, more preferably tetrahydrofuran. Compounds Ic may be recovered using conventional recovery techniques such as crystallization.

The compounds II and III employed as starting materials in preparation of compounds Ic are either known or can be prepared from known materials by established procedures. The Grignard compounds of formula III are thus conveniently prepared by reaction of magnesium with the corresponding 4-halo-1-aminoalkoxybenzene and the latter compounds conveniently prepared by reaction of a p-halophenol with the alpha halo derivative of or forming the desired ω-aminoalkoxy moiety and having the following formula

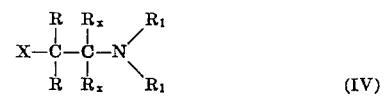

(IV)

wherein R, $R_1$ and X are as defined, and both $R_x$ are both hydrogen or lower alkyl but when lower alkyl both R are hydrogen.

It will thus be evident that the reaction of the appropriate p-halophenol starting material with a compound IV involves a synthesis of the known Williamson type. The compounds III in which R is lower alkyl are desirably prepared from compound IV in which $R_x$ is lower alkyl because such compound IV readily undergo rearrangement on reaction with phenol starting material (phenolate) to form compounds III in which the alpha carbon substituent R is lower alkyl, as described by J.F. Kerswin et al., J.A.C.S. 69, 2961 (1947).

The compounds of formula I and their pharmaceutically acceptable acid addition salts, particularly compound Ib, are useful because they possess pharmacological activity in animals. In particular, the compounds are useful as hypolipidemic agents, as evidenced, for example, by having hypocholesteremic activity, as indicated by tests on a group of white rats which are given typically 20 – 80 milligrams per kilogram of body weight per diem of the compound orally, for 6 days, followed by extraction with isopropanol of serum or plasma after anesthetizing the rats with sodium hexobarbital, and then noting the cholesterol content as compared to that of a control group. The cholesterol content is determined by the Technicon method N 24a. For such usage, the compounds may be administered orally as such or admixed with conventional pharmaceutical carriers. The dosage administered may vary depending on the particular compound employed, the therapy desired and the severity of the condition being treated. In general, satisfactory results are obtained when administered at a daily dosage of from about 1 milligram to about 100 milligrams per kilogram of animal body weight, preferably given in divided doses, 2 to 4 times a day, or in sustained release form. For most larger mammals (e.g., primates) the total daily dosage is from about 70 milligrams to about 700 milligrams of the compound and the dosage forms suitable for internal use comprise from about 17.5 milligrams to about 350 milligrams of active compound in intimate admixture with a solid or liquid pharmaceutically acceptable carrier or diluent.

A representative formulation is a tablet prepared by conventional tabletting techniques and containing the following ingredients:

| Ingredient | Parts by Weight |
|---|---|
| 2-[4-(1-cyclohexen-1-yl)cyclohexyloxy]-N,N,-2-trimethylpropylamine hydrochloride | 50 |
| Tragacanth | 10 |
| Lactose | 197.5 |
| Corn Starch | 25 |
| Talcum | 15 |
| Magnesium stearate | 2.5 |

This invention is illustrated but not limited by the following examples.

EXAMPLE 1

1-[p-(3-dimethylamino-2-methyl-2-propoxyphenyl)]cyclohexanol

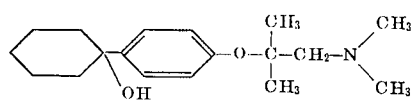

A solution of 10.0 g. (0.037 mole) of 2-(p-bromophenoxy)-N,N,-2-trimethylpropylamine in 25 ml of tetrahydrofuran is added dropwise to 0.9 g (0.037 mole) of magnesium turnings in 20 ml of tetrahydrofuran. The reaction is carried out under dry nitrogen. After the addition is completed, the resulting mixture is gently refluxed for an additional hour. A solution of 3.43 g (0.035 mole) of cyclohexanone in 30 ml of tetrahydrofuran is then added dropwise at room temperature and the reaction mixture is then kept at reflux temperature for 10 hours and finally hydrolyzed with saturated ammonium chloride solution. The resulting alkaline mixture is extracted twice with diethyl ether, the combined ether layers are washed neutral with water and dried over magnesium sulfate. The drying agent is removed by filtration and the solvent removed by gentle warming under reduced pressure (water pump) to obtain a crude solid. The solid is recrystallized from hexane yielding 1-[p-(3-dimethylamino-2-methyl-2-propoxyphenyl)]cyclohexanol.

EXAMPLE 2

2-[4-(1-cyclohexen-1-yl)cyclohexyloxy]-N,N,-2-trimethylpropylamine hydrochloride

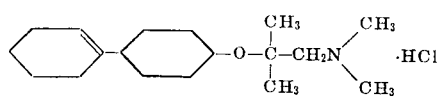

The 1-[p-(3-dimethylamino-2-methyl-2-propoxy)]cyclohexanol obtained in Example 1, above, is dissolved in 40 ml of ethanol and treated with an excess of a saturated solution of hydrogen chloride in ethanol and refluxed for 20 minutes. The ethanol is distilled off under reduced pressure leaving a white solid which is triturated several times with diethyl ether. The crude hydrochloride is recrystallized twice from isopropanol yielding 2-[4-(1-cyclohexen-1-yl)cyclohexyloxy]-N,N,-2-trimethylpropylamine hydrochloride; mp 220.2° – 222° C.

EXAMPLE 3

2-(p-Cyciohexylphenoxy)-N,N,-2-trimethylpropylamine hydrochloride

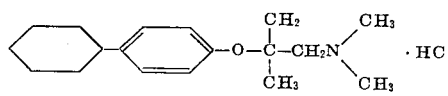

A solution of 5.0 g. of 2-[4-(1-cyclohexen-1-yl)cyclohexyloxy]-N,N,-2-trimethylpropylamine hydrochloride of Example 2, in 25 ml. of glacial acetic acid is hydrogenated at atmospheric pressure over 4.8 g. of 10 percent palladium on charcoal. The catalyst is separated by filtration and the solvent evaporated under reduced pressure. The residue is taken up in water, made alkaline with 2N sodium hydroxide and extracted with ether. The ethereal layer is washed neutral with water, dried over magnesium sulfate and concentrated under reduced pressure. The resulting crude oil is dissolved in 20 ml. of diethyl ether and treated with an excess of a saturated solution of hydrogen chloride in either. The solvent is decanted and the resulting white solid triturated several times with ether. The crude hydrochloride is recrystallized from isopropanol followed by two recrystallizations from acetone 95 percent, isopropanol 5 percent, yielding 2-(p-cyclohexylphenoxy)-N,N,-2-trimethylpropylamine hydrochloride; m.p. 204.5°-205.5°C.

EXAMPLE 4

1-[p-(2-Dimethylamino-1,1-dimethylethoxy)phenyl]-2-phenylcyclohexanol hydrochloride

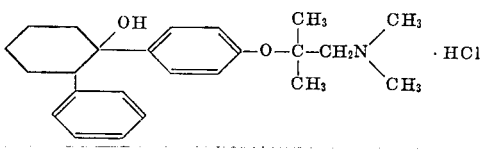

A solution of 10.0 g. (0.037 mole) of 2-(p-bromophenoxy)-N,N,-2-trimethylpropylamine in 25 ml. of tetrahydrofuran is added dropwise to 0.9 g. (0.037 mole) of magnesium turnings in 20 ml. of tetrahydrofuran. The reaction is carried out under dry nitrogen. After the addition is completed, the resulting mixture is gently refluxed for an additional hour. A solution of 6.09 g. (0.035 mole) of 2-phenyl-cyclohexanone in 30 ml. of tetrahydrofuran is then added dropwise at room temperature and the reaction mixture is then kept at reflux temperature for 10 hours and finally hydrolyzed with saturated ammonium chloride solution. The resulting alkaline mixture is extracted twice with diethyl ether, the combined ether layers are washed neutral with water and dried over magnesium sulfate. The drying agent is removed by filtration and the solvent removed by gentle warming under reduced pressure (water pump) to obtain a solid, 1-[p-(2-dimethylamino-1,1-dimethylethoxy)phenyl]-2-phenylcyclohexanol hydrochloride.

EXAMPLE 5

N,N-2-Trimethyl-2-[p-(6-phenyl-1-cyclohexen-1-yl)phenoxy]propylamine hydro-chloride

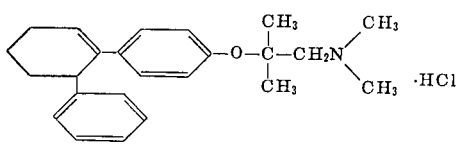

The 1-[p-(2-dimethylamino-1,1-dimethylethoxy)phenyl]-2-phenylcyclo-hexanol hydrochloride obtained in Example 4, above, is dissolved in 40 ml. of ethanol and treated with an excess of a saturated solution of hydrogen chloride in ethanol and refluxed for 20 minutes. The ethanol is distilled off under reduced pressure leaving a white solid which is triturated several times with diethyl ether. The crude hydrochloride is recrystallized twice from isopropanol yielding N,N-2-trimethyl-2-[p-(6-phenyl-1-cyclohexen-1-yl) phenoxy]propylamine hydrochloride.

EXAMPLE 6

N,N-2-Trimethyl-2-[p-(2-phenylcyclohexyl) phenoxy]propylamine hydrochloride

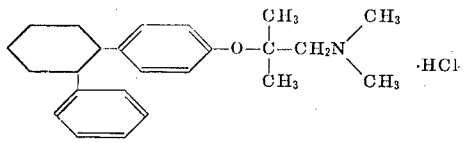

A solution of 5.0 g. of N,N-2-trimethyl-2]p-(6-phenyl-1-cyclohexen-1-yl) phenoxy]propylamine hydrochloride of Example 5, in 25 ml. of glacial acetic acid is hydrogenated at atmospheric pressure over 4.8 g. of 10 percent palladium on charcoal. The catalyst is separated by filtration and the solvent evaporated under reduced pressure. The residue is taken up in water, made alkaline with 2N sodium hydroxide and extracted with ether. The ethereal layer is washed neutral with water, dried over magnesium sulfate and concentrated under reduced pressure. The resulting crude oil is dissolved in 20 ml. of diethyl ether and treated with an excess of a saturated solution of hydrogen chloride in ether. The solvent is decanted and the resulting white solid triturated several times with ether. The crude hydrochloride is recrystallized from isopropanol followed by two recrystallizations from acetone 95 percent, isopropanol 5 percent, yielding N,N-2-trimethyl-2-[p-(2-phenylcyclohexyl)]phenoxy propylamine hydrochloride.

EXAMPLE 7

N-[2-(p-Cyclohexylphenoxy)ethyl]-pyrrolidine hydrochloride

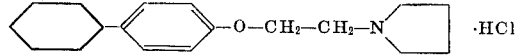

Following the procedure of Example 1, and employing equivalent amounts, N-[2-(p-bromophenoxy)ethyl]pyrrolidine is reacted with cyclohexanone. The resulting product is treated with an excess of a saturated solution of hydrogen chloride following the procedure of Example 2. The resulting product is then hydrogenated following the procedure of Example 3 to obtain upon crystallization the product N-[2-(p-cyclohexylphenoxy)ethyl]-pyrrolidine hydrochloride.

EXAMPLE 8

Ethylamine, N,N-diethyl-2-(p-cyclohexylphenoxy)hydrochloride

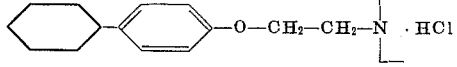

Following the procedure of Example 1 and employing equivalent amount, p-bromo-diethylaminoethoxy benzene is reacted with cyclohexanone. The resulting product is treated with an excess of a saturated solution of hydrogen chloride following the procedure of Example 2. The resulting product ethylamine, N,N-diethyl-2-(p-cyclohexenylphenyl)hydrochloride, m.p. 164–166°C. is then hydrogenated following the procedure of Example 3 to obtain upon crystallization the product ethylamine, N,N-diethyl-2-(p-cyclohexylphenoxy)hydrochloride; m.p. 185°–187°C.

What is claimed is:

1. A compound of the formula

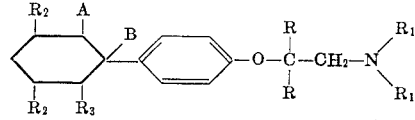

where each of R and $R_2$ is, independently, hydrogen or lower alkyl of one to four carbon atoms,
   each of $R_1$ is, independently, lower alkyl of one to four carbon atoms, or both $R_1$ together form an alkylene bridge of four to five carbon atoms,
   $R_3$ is hydrogen or phenyl, and
   A is hydrogen,
   B is hydrogen or OH; or
   A and B together represent a carbon to carbon bond, or a pharmaceutically acceptable acid addition salt thereof.

2. The compound of claim 1 which is 1-[p-(3-dimethylamino-2-methyl-2-propoxyphenyl)]cyclohexanol.

3. The compound of claim 1 which is 2-[4-(1-cyclohexen-1-yl) cyclohexyloxy]-N,N-2-trimethylpropylamine hydrochloride.

4. The compound of claim 1 which is 2-(p-cyclohexylphenoxy)-N,N,-2-trimethylpropylamine hydrochloride.

5. The compound of claim 1 which is 1-[p-(2-dimethylamino-1,1-dimethylethoxy)phenyl]-2-phenyl-cyclohexanol hydrochloride.

6. The compound of claim 1 which is N,N-2-trimethyl-2-[p-(6-phenyl-1-cyclohexen-1-yl)phenoxy]propylamine hydrochloride.

7. The compound of claim 1 which is N,N-2-trimethyl-2-[p-(2-phenylcyclohexyl)phenoxy]propylamine hydrochloride.

8. The compound of claim 1 which is N-[2-(p-cyclohexylphenoxy) ethyl]-pyrrolidine hydrochloride.

9. The compound of claim 1 which is ethylamine, N,N-diethyl-2-(p-cyclohexylphenoxy)hydrochloride.

10. The compound of claim 1 which is ethylamine, N,N-diethyl-2-(p-cyclohexenylphenyl)hydrochloride.

11 - A compound of the formula:

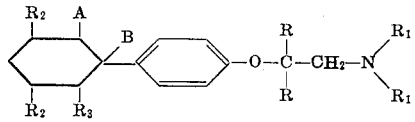

where each of R and $R_2$ is, independently, hydrogen or lower alkyl of one to four carbon atoms,
   each of $R_1$ is, independently, lower alkyl of one to four carbon atoms, or both $R_1$ together form an alkylene bridge of four carbon atoms,
   $R_3$ is hydrogen or phenyl, and
   A and B together represent a carbon to carbon bond, or A is hydrogen and B is OH, or a pharmaceutically acceptable acid addition salt thereof.

12 - A compound according to claim 1 wherein $R_3$ is hydrogen.

* * * * *